Sept. 12, 1961 J. R. HARKNESS 2,999,491
INTERNAL COMBUSTION ENGINE AND METHOD OF OPERATING THE SAME TO
OBTAIN COMPRESSION REDUCTION DURING CRANKING
Filed Sept. 15, 1960 3 Sheets-Sheet 1

Inventor
Joseph R. Harkness
By Ira Hutton Jones
Attorney

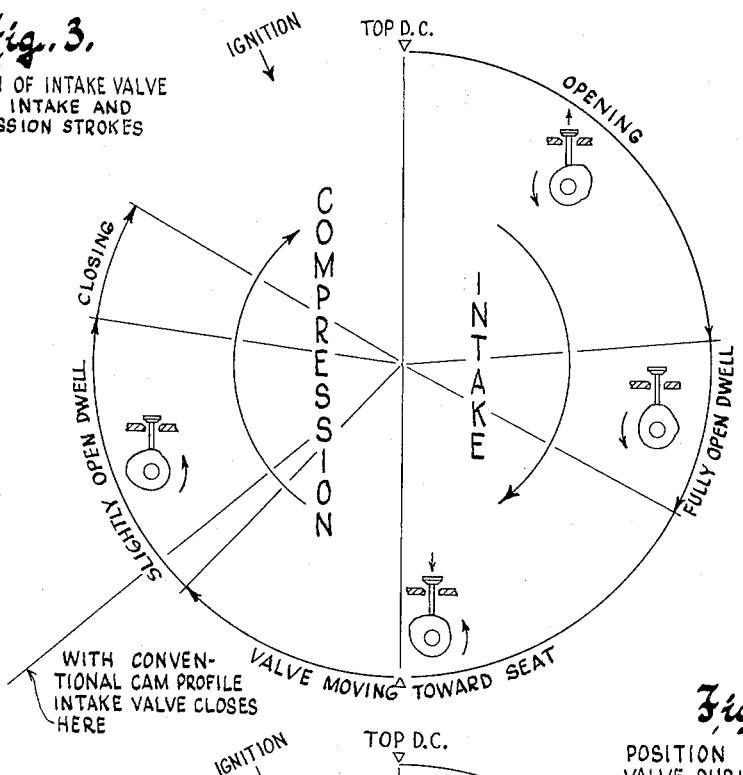
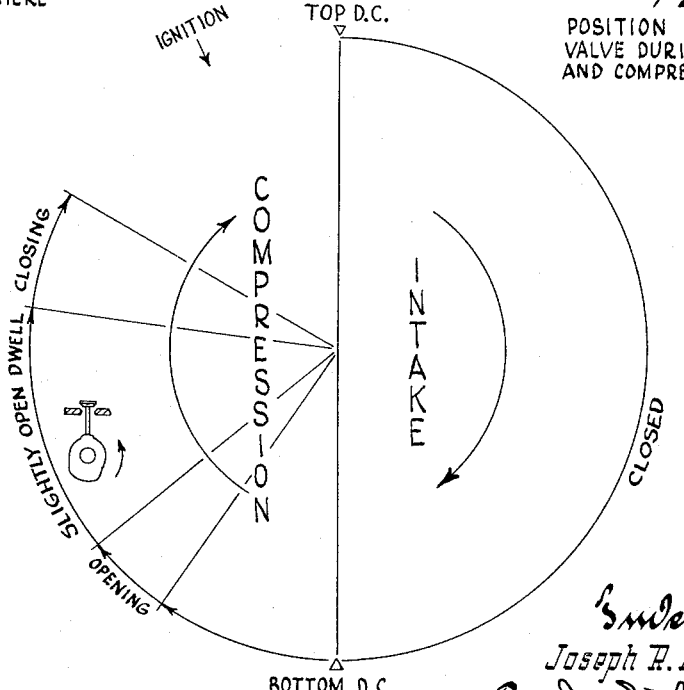

United States Patent Office 2,999,491
Patented Sept. 12, 1961

2,999,491
INTERNAL COMBUSTION ENGINE AND METHOD OF OPERATING THE SAME TO OBTAIN COMPRESSION REDUCTION DURING CRANKING
Joseph R. Harkness, Milwaukee, Wis., assignor to Briggs & Stratton Corporation, Milwaukee, Wis., a corporation of Delaware
Filed Sept. 15, 1960, Ser. No. 56,260
12 Claims. (Cl. 123—182)

This invention relates to internal combustion engines, and more particularly to single cylinder four-stroke cycle engines used to power lawn mowers, garden cultivators, lawn sweepers, snow blowers and the like; and its purpose is to make starting of such engines easier.

The use of internal combustion engine-powered implements, and especially rotary lawn mowers, has spread to such proportions that women are as much a factor in determining the acceptance of any given engine as are men. Hence, where efficiency and ruggedness may have been controlling considerations in the past, the ease with which the engine can be started now dominates the list of attributes of the successful engine. This has led engine manufacturers to the adoption of the windup spring-type starter, wherein release of a spring wound up by means of a crank, does the actual cranking of the engine; and to the use of electric starters where the engine is destined for use on the larger riding type of mower-tractor combinations.

Obviously, these and all the other expedients that have been proposed and are being employed with a view toward making it easier to start the engine, increase its cost. Moreover, in the case of the windup spring-type starter, the operator must stoop or squat down to turn the crank by which the spring is wound up. Needless to say, this is an inconvenience. It is also a source of danger, since it places the operator in close juxtaposition to the mower, and some windup starters have been known to "kick back."

It is thus readily apparent that an engine which can be easily started, and in which the procedure of starting the engine does not require the operator to assume an awkward, inconvenient posture, and which above all does not increase the cost of the engine, is not only an alluring prospect, but a goal sought after by engine manufacturers practically as long as engines have been made, but especially ever since the advent of the first engine-driven power lawnmower.

The present invention achieves this objective. With it, a singe cylinder four-stroke cycle engine like those used on rotary power lawn mowers may be cranked by a pull on the starting rope produced with such ease that any woman can do it.

It is, of course, common knowledge that if compression were reduced or eliminated, cranking of the engine would be easier. The art is replete with compression reducing and relieving devices for internal combustion engines, but the sum total of all its teachings is that whatever means are employed to reduce or relieve compression, this means must be rendered inoperative—either manually or automatically by the engine itself—after the engine has been started. Hence, even the simplest means heretofore employed to reduce or relieve compression with a view to making it easier to crank the engine, involved mechanism of some sort or other to either shift a cam, close a valve or otherwise render the compression reducing or relieving device inoperative.

It is understandable, therefore, that engine manufacturers have shied away from these past expedients, and instead have gone to the present day windup spring-type starters, or even the much costlier electric starters. On the other hand, it is a foregone conclusion that if significant compression reduction during cranking of the engine, but not during running of the engine, could be had without adding even a fraction of a cent to the cost of the engine, and without entailing any special manual attention to the engine either during starting or running, a result long sought would be achieved.

The discovery upon which this invention is based, has made the attainment of this objective a reality. The discovery is this—if the combustion chamber is vented to a very slight degree during the major portion of the compression stroke of the piston, compression is significantly reduced during starting when piston travel is slow, whereas at running speeds with the piston travelling much faster, any venting that occurs is not enough to preclude acceptable engine performance.

In the light of the foregoing discovery, it is an object of this invention to so operate an internal combustion engine that during each and every compression stroke of the piston the combustion chamber is restrictedly vented in a way which does not preclude the attainment at running speeds of compression values required for acceptable engine performance, but which is sufficient to significantly reduce compression during starting of the engine to thus make cranking of the engine easier without significantly detracting from its efficiency.

With a view toward achieving the purpose of this invention in the most simple way and without entailing any additional cost in the production of the engine, it is another object of the invention to so modify the profile of the cam controlling either the intake or the exhaust valve, and preferably the former, that the valve controlled thereby is held slightly off its seat, from the time the intake valve normally closes in a conventional engine until just before firing of the spark plug.

There are, of course, other ways in which the combustion chamber can be vented during the compression stroke of the engine to accomplish the purpose of this invention. For instance, a third valve i.e. a valve in addition to the regular intake and exhaust valves of the engine could be used. Such an additional valve would, of course, be controlled by a cam other than the intake and exhaust cams.

The essence of the invention is in restrictedly venting the combustion chamber only during the compression stroke of the piston—but during every such stroke of the piston, regardless of engine speed—and only to such an extent that, at running speeds, the attainment of compression values needed for good engine performance are not precluded, while at the much slower piston travel incident to starting of the engine, a significant reduction in compression is achieved, to the end that cranking is made easier; and since the intake valve is normally open during the transition from the intake to the compression stroke, restricted venting of the combustion chamber is most conveniently obtained by simply delaying final closure of the intake valve, and this requires nothing more than a slight reshaping of the profile of the cam which controls the intake valve.

The accompanying drawings illustrate several complete examples of the physical embodiments of the invention, constructed according to the best modes so far devised for the practical application of the principles thereof, and in which:

FIGURE 3 is a diagram illustrating how the opening and closing of the intake valve during the intake and compression strokes of the engine, has been altered in accordance with the preferred embodiment of the invention;

Figure 5:
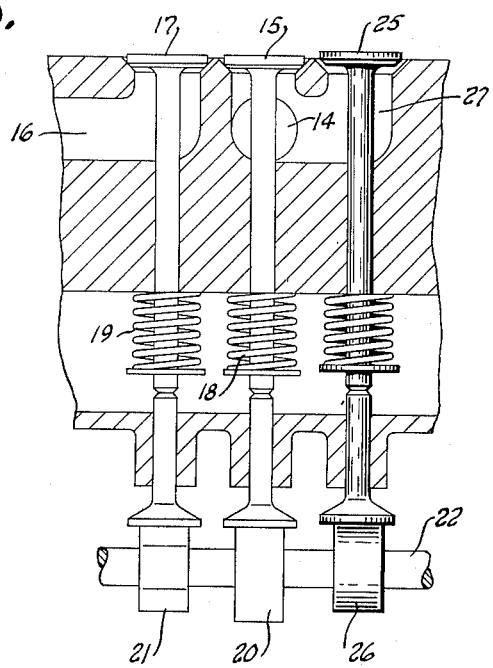

FIGURE 4 is a diagram similar to FIGURE 3, but depicting a modified embodiment of the invention, wherein the exhaust valve, rather than the intake valve, is employed to obtain the desired compression reduction; and FIGURE 5 is a fragmentary sectional view through a portion of the engine illustrating another modification of the invention wherein a third valve effects the desired compression reduction.

Since this invention is primarily concerned with single cylinder four-stroke cycle internal combustion engines, the drawings to which reference is now had, illustrate the invention as embodied in such an engine. As is customary, the engine shown has a cylinder 7, a crankshaft 8, and a piston 9 operatively connected with the crankshaft through a connecting rod 10. The piston, of course, coacts with the cylinder and a cylinder head 11 to define a combustion chamber 12, and a spark plug secured in the cylinder head ignites the fuel charge drawn into the combustion chamber during the intake stroke of the piston and compressed during the compression stroke thereof.

As is customary, the instant of ignition—that is, the instant the spark plug fires—generally occurs just before the piston completes its compression stroke.

The fuel charge is drawn into the combustion chamber from the carburetor of the engine through an intake manifold 14, under control of an intake valve 15, and the products of combustion are expelled from the cylinder during the exhaust stroke through an exhaust port 16 controlled by an exhaust valve 17. The intake and exhaust valves are closed by springs 18 and 19, and are opened by cams 20 and 21, respectively, the cams being on a cam shaft 22, which is driven from the crankshaft at one-half crankshaft speed.

All the foregoing is, of course, conventional internal combustion engine construction, and from the standpoint of this invention the significant fact is that in the conventional engine the profile of the cam which controls the intake valve is such that the intake valve closes completely shortly after the piston begins its compression stroke. The exact instant at which the intake valve has been closed in the past has varied with different engine manufacturers, but in the small single cylinder engine field, the intake valve is usually fully closed when the piston has travelled approximately one-fifth of its compression stroke. Consequently, for about four-fifths of the compression stroke, the combustion chamber was closed. This made cranking difficult.

By contrast, in the preferred embodiment of this invention, final closure of the intake valve is delayed until just prior to the instant of ignition and, more specifically, until the piston has completed approximately three-fourths of its compression stroke. The significant and important thing about this delay in closing the intake valve is, however, the slight extent of its opening during this period. Specifically, it has been found that for the period in question, i.e. from the time that the valve would normally close in a conventional engine until just before the spark plug fires, the valve should be open only between five and twenty-thousandths of an inch.

Accordingly, the profile of the cam 20 which controls the intake valve, is shaped to provide a period of dwell extending for approximately 54° of crankshaft rotation, as indicated in the diagram FIGURE 3 by the legend "Slightly Open Dwell." During this period of dwell, the intake valve is held off its seat an amount which is preferably constant between five and twenty-thousandths of an inch; and during approximately the next 20° of crankshaft rotation, it closes fully.

Delaying the closure of the intake valve in this manner, and holding it off its seat five to twenty-thousandths of an inch, as described, restrictedly vents the combustion chamber during the major portion of the compression stroke. It has been discovered that such slight venting of the combustion chamber for the indicated portion of the compression stroke, greatly reduces the compression during cranking of the engine when piston travel is slow, but has practically no effect upon compression after the engine starts and is operating under its own power. This follows from the fact that during cranking, an appreciable amount of the fuel charge drawn into the combustion chamber will be expelled therefrom through the vent by the slow moving piston—but, when the piston is travelling at the much higher speeds incident to running of the engine, the amount of fuel charge that is expelled through the vent is so slight that it has practically no effect upon the power delivered by the engine.

In other words, at high piston speeds the venting resulting from having the intake valve held slightly off its seat during a major portion of the compression stroke, does not preclude the attainment of compression values needed for acceptable engine performance, but during cranking when the piston moves much slower, a significant proportion of the fuel charge can escape through the restricted vent. In retrospect it is evident that this should be so, but in the light of the prior art which is replete with examples of various means and devices for reducing or relieving compression, the results obtained were entirely unexpected. The idea that no change should or need be made in the means for reducing compression, once the engine begins to run under its own power, is in fact contrary to the sum total of all the prior art teachings.

The impact of this discovery upon the engine industry is great and far reaching. Foremost, of course, is the fact that through it an objective that has been long sought—namely, easier cranking of the engine—has been obtained without in anywise adding to the cost of the engine. Next, since the only structural change needed is a slight modification of the profile of the cam which controls the intake valve, adoption of the invention in production can be effected "over night," so to speak.

Another important advantage of the invention is that it renders "kicking" of the engine harmless. "Kicking," of course, occurs only at slow speeds—as in cranking, and while this invention does not eliminate "kicking," the force of a kick occurring in the engine of this invention is insignificant in comparison with that of a conventional engine. The reduction in the force of the kick is explained by the fact that because of the effectiveness of the venting of the combustion chamber during cranking, there is only a small amount of fuel present therein to be exploded; and, secondly, directly after the engine "kicks," the intake valve reopens and again vents the combustion chamber.

Inasmuch as the intake valve is open during the transition from the intake to the compression stroke, the most convenient way of utilizing this invention is by delaying closure of this valve in the manner described. However, it can also be done by opening the exhaust valve 17 at the proper time and holding it open for the time and to the extent required. To do this the cam 21 which controls the exhaust valve is simply provided with an additional lobe of such proportions and so placed that the exhaust valve will be opened shortly after the piston begins its compression stroke, held off its seat five to twenty-thousandths of an inch for approximately 54° of crankshaft rotation, and then within approximately the next 20° of crankshaft rotation, allowed to reclose. In this case, the intake valve would operate in the normal manner.

Also, if desired, the engine could be provided with a special venting valve 25 as shown in FIGURE 5. This valve would be controlled by its own cam 26, the profile of which would effect opening of the valve 25 shortly after the piston began its compression stroke, hold it open at a constant setting between five and twenty-thousandths of an inch for approximately 54° of crankshaft rotation, and then, within about the next 20° of crankshaft rotation, allow the valve to close. If such a special compression reduction valve is employed, the venting passage 27 which it controls, preferably would lead to the intake manifold 14, as also shown in FIGURE 5, so that the fuel escaping from the combustion chamber would not be lost.

Before tests of this invention were conducted, it was thought that communicating the intake manifold with the combustion chamber during a major portion of the compression stroke of the piston, might have some objectionable effect upon the functioning of the carburetor and the admission of the fuel into the combustion chamber during the intake stroke. It was also thought that the venting of the combustion chamber during running of the engine would seriously affect its power output and general performance. Actual experience has proved that these misgivings were entirely unfounded.

Repeated tests have demonstrated that the loss in horsepower delivered by the engine operating at running speeds averages only five percent. This is an insignificant price to pay for the great reduction in work required to crank the engine, which by actual test was found to be less than half that needed to crank a comparable conventional engine.

The delivered horsepower was determined in the conventional way. To ascertain the work required to crank the engine, a weight attached to the staring rope was dropped a definite distance. To crank the conventional engine required a seventy pound weight dropped two feet; but the same engine modified in accordance with this invention was repeatedly started by dropping a thirty pound weight the same distance. This means that a pull of forty-five pounds for a distance of eighteen inches or sixty pounds through twelve inches is all that is needed to crank the engine of this invention.

Figure 1:
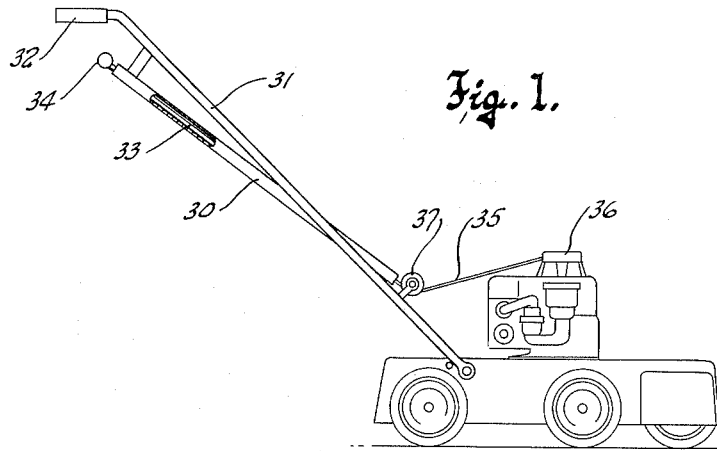
FIGURE 1 is a side view of a rotary power lawn mower powered by an engine embodying this invention, and illustrating a very convenient and easy way of cranking the engine made possible by this invention.
Figure 2:
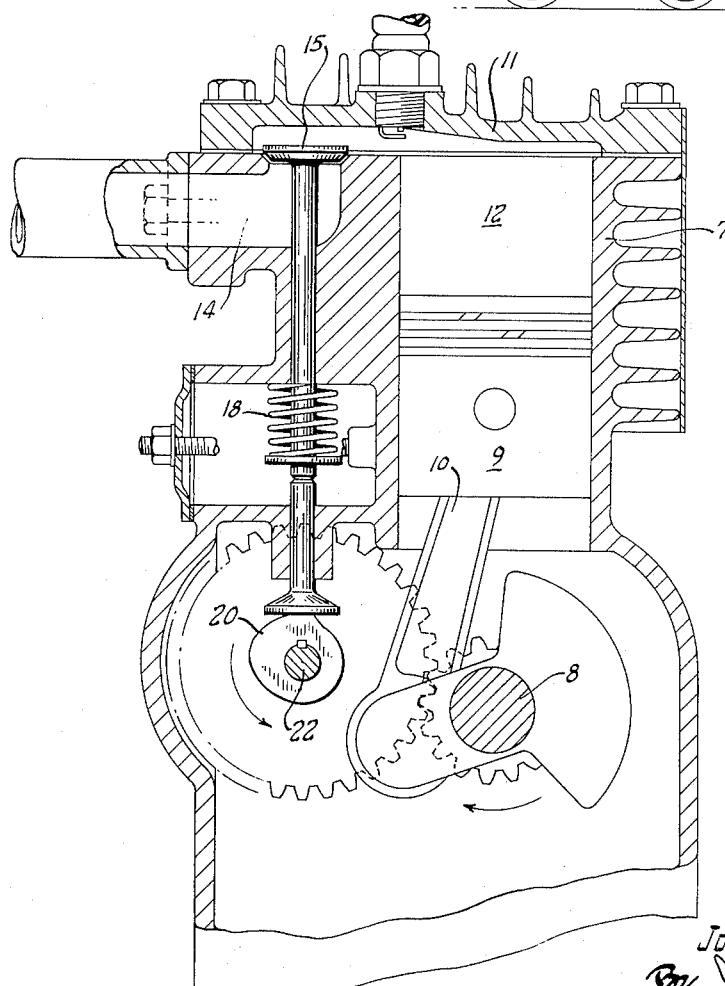
FIGURE 2 is a vertical sectional view through the engine embodying the invention in its preferred form.

Although this invention may have little significance to the makers of large multi-cylinder engines, the small portable engine field with its predominance of single cylinder engines is greatly benefited thereby. Its greatest impact no doubt, is upon the single cylinder four-stroke engines used to power rotary lawn mowers. Here the invention not only make it easier to crank the engine, but because it does so an "on-the-handle" starting device becomes practicable and feasible. One such starting device is illustrated in FIGURE 1. It consists of a guide tube 30 fixed to the handle 31 of the mower with its upper end near the handle grips 32 and its lower end close to the mower deck. Slidably telescoped within the guide tube 30 is a second tube 33 having a handle 34 fixed to its upper end and having the rope 35 of a conventional rewind type starter mechanism 36 with which the engine is equipped, received therein and attached to its upper end. Where the rope emerges from the lower ends of the telescoped tubes it passes under a pulley 37 and from there it extends at an upward angle to the starter mechanism 36.

To start the engine, the operator simply grasps the handle 34 with one hand and pulls out the tube 33, and since this does not require a great deal of force, he can easily steady the mower with his other hand on one of the handle grips 32, or even tilt the mower back to lift its blade out of the grass if the engine stalled while cutting tall grass. In either event, the operator can crank the engine without having to exert brute force and without losing his equilibrium.

From the foregoing description taken with the accompanying drawings, it will be readily apparent that, viewed in the light of the prior art, the results achieved by this invention were entirely unexpected, and that the invention not only has attained an objective long sought by engine builders, but most significantly, has done so without adding to the cost of the engine and in a way which makes it feasible and entirely possible to forthwith adopt the invention in production.

It should also be understood that while the specific embodiments of the invention hereindisclosed represent the best modes in which the invention has been thus far embodied, departures may be made therefrom within the scope of the invention, as defined by the appended claims.

What is claimed as my invention is:

1. The hereindescribed method of operating a four-stroke cycle internal combustion engine having a cylinder, a crankshaft, a piston in the cylinder operatively connected with the crankshaft and coacting with the cylinder to form a combustion chamber, and poppet intake and exhaust valves for the combustion chamber, the piston having the customary intake, compression, power and exhaust strokes, which method comprises: opening the intake poppet valve to admit combustible fuel mixture into the combustion chamber during the intake stroke, igniting the fuel mixture near the end of the compression stroke, and opening the exhaust poppet valve to enable the products of combustion to be expelled during the exhaust stroke—all in the conventional manner; and said method being characterized by automatically and in timed relation with rotation of the crankshaft, so controlling the opening and closing of one of said poppet valves that during the compression stroke of the piston, said valve is held between five and twenty-thousandths of an inch off its seat while the piston moves from a point substantially one-eighth its total ascent from bottom dead-center to a point between one-half and three-quarters its total ascent, and is then gradually closed, with final closure occurring when the piston has reached a point in its compression stroke substantially three-fourths its total ascent from bottom dead-center, whereby said valve in addition to serving its conventional purpose, provides a precisely controlled orifice leading from the combustion chamber and having a flow capacity such that at running speeds the loss of compression resulting from the open orifice is insignificant and does not preclude acceptable engine performance, whereas during starting of the engine when piston travel is slow, compression is appreciably reduced so that cranking of the engine is easier.

2. The method of claim 1, wherein it is the intake valve of the engine which is controlled in the manner set forth.

3. The method of claim 2, wherein it is the exhaust valve of the engine which is controlled in the manner set forth.

4. An internal combustion engine having a cylinder, a crankshaft, a piston operating in the cylinder operatively connected with the crankshaft and coacting with the cylinder to define a combustion chamber in which a charge of an air-fuel mixture fed into the engine is compressed during the compression stroke of the piston, characterized by: means to establish a vent passage out of the combustion chamber, said means including a poppet valve to open and close the passage, and a cam driven by the crankshaft to control the poppet valve, the cam having a fixed profile to cause the poppet valve to have a period of zero velocity during every compression stroke of the piston, beginning when the piston has travelled substantially one-eighth the total distance from bottom dead-center to top dead-center and ending when the piston has travelled between one-half and three-quarters said total distance, during which period of zero velocity, the cam holds the poppet valve between five and twenty-thousandths of an inch off its seat; the fixed profile of the cam further being such that at the end of said period of zero velocity, the cam effects gradual closure of the valve with full closure occurring when the piston has travelled substantially three-quarters said total distance, so that at cranking speeds part of the fuel charge being compressed in the combustion chamber escapes therefrom to significantly reduce compression and make cranking of the engine easier while at running speeds the slight degree the valve is open during the compression stroke does not preclude the attainment of compression values required for acceptable engine performance.

5. In a four-stroke cycle internal combustion engine having a cylinder, a crankshaft, and a piston in the cylinder operatively connected with the crankshaft and coacting with the cylinder to define a combustion chamber in which a charge of air-fuel mixture fed into the engine is compressed during the compression stroke of the piston: means defining a passage communicating with the combustion chamber and through which part of the charge in the combustion chamber may escape; a poppet valve for closing said passage; and a cam driven by the crankshaft in synchronism therewith to control the poppet valve, said cam having a fixed profile such that during every compression stroke of the piston, said poppet valve is held between five and twenty-thousandths of an inch off its seat while the piston moves from a point substantially one-eighth its total ascent from bottom dead-center to a point between one-half and three-quarters its total ascent and then gradually closes with final closure occurring when the piston has reached a point in its compression stroke substantially three-quarters its total ascent from bottom dead-center, whereby said valve provides a precisely controlled orifice through which part of the charge being compressed in the combustion chamber escapes to thus significantly reduce compression during starting of the engine when the piston travels slowly and thereby make cranking of the engine easier, while at running speeds the loss of compression resulting from the open orifice is insignificant and does not preclude the attainment of compression values required for acceptable engine performance.

6. The improvement in a four-stroke cycle internal combustion engine set forth in claim 5, wherein said poppet valve is the intake valve for the cylinder.

7. The improvement in a four-stroke cycle internal combustion engine set forth in claim 5, wherein said poppet valve is the exhaust valve for the cylinder.

8. The improvement in a four-stroke cycle internal combustion engine set forth in claim 5, wherein said poppet valve is separate from the conventional intake and exhaust valves for the engine cylinder, and said cam is in addition to the cams which open the intake and exhaust valves; and wherein the means defining said passage includes as a part thereof the intake manifold of the engine so that the part of the charge expelled from the combustion chamber enters the intake manifold.

9. A four-stroke cycle internal combustion engine having a cylinder, a crankshaft, and a piston in the cylinder operatively connected with the crankshaft and cooperating with the cylinder to define a combustion chamber in which a charge of air-fuel mixture is compressed during the compression stroke of the piston, said engine also having a cam controlled poppet-type intake valve which opens to admit the charge into the combustion chamber during the intake stroke of the piston, ignition means to ignite the charge after it has been compressed, and a cam controlled poppet-type exhaust valve which opens to permit expulsion of the products of combustion during the exhaust stroke of the piston, said engine being characterized by: a fixed profile on the cam which controls one of said poppet valves shaped to hold the same between five and twenty-thousandths of an inch off its seat during every compression stroke of the piston while the piston moves from a point substantially one-eighth its total ascent from bottom dead-center to a point between one-half and three-quarters its total ascent, and then effects gradual closure of said poppet valve with final closure occurring when the piston has reached a point in its compression stroke between six tenths and eight tenths of its total ascent from bottom dead-center to top dead-center.

10. The improved internal combustion engine of claim 9, wherein it is the cam which controls the intake valve that has the defined profile.

11. The improved internal combustion engine of claim 9, wherein it is the cam which controls the exhaust valve that has the defined profile.

12. The improved internal combustion engine of claim 9, wherein said cam profile is such as to give the valve it controls three periods of zero velocity, during the entirety of one of which periods the valve maintains a constant position spaced from its seat a distance within said range of five to twenty-thousandths of an inch.

References Cited in the file of this patent
UNITED STATES PATENTS

| | | |
|---|---|---|
| 1,156,123 | Wygodsky | Oct. 12, 1915 |
| 1,238,221 | Tibbetts | Aug. 28, 1917 |
| 1,301,807 | Bouteille | Apr. 29, 1919 |
| 1,384,133 | Howe | July 12, 1921 |
| 1,610,888 | Sauer | Dec. 14, 1926 |
| 2,042,967 | Russell | June 2, 1936 |